(12) United States Patent
Soumenkov et al.

(10) Patent No.: US 12,039,047 B2
(45) Date of Patent: *Jul. 16, 2024

(54) DETECTING MALICIOUS ACTIVITY IN A COMPUTER SYSTEM USING COMPUTER SYSTEM OBJECTS

(71) Applicant: AO KASPERSKY LAB, Moscow (RU)

(72) Inventors: Igor I. Soumenkov, Moscow (RU); Sergey Y. Golovanov, Moscow (RU)

(73) Assignee: AO KASPERSKY LAB, Moscow (RU)

( * ) Notice: Subject to any disclaimer, the term of this patent is extended or adjusted under 35 U.S.C. 154(b) by 0 days.

This patent is subject to a terminal disclaimer.

(21) Appl. No.: 17/451,761

(22) Filed: Oct. 21, 2021

(65) Prior Publication Data
US 2022/0035917 A1  Feb. 3, 2022

Related U.S. Application Data

(63) Continuation of application No. 16/146,142, filed on Sep. 28, 2018, now Pat. No. 11,163,881.

(30) Foreign Application Priority Data

Jun. 29, 2018 (RU) .............................. 2018123685

(51) Int. Cl.
*G06F 21/56* (2013.01)
*G06F 16/901* (2019.01)
*G06N 20/00* (2019.01)

(52) U.S. Cl.
CPC ........ *G06F 21/566* (2013.01); *G06F 16/9024* (2019.01); *G06F 2221/034* (2013.01); *G06N 20/00* (2019.01)

(58) Field of Classification Search
CPC .............. G06F 21/566; G06F 16/9024; G06F 2221/034; G06F 16/289; G06F 21/577; G06F 21/562; G06N 20/00; G06N 5/022
See application file for complete search history.

(56) References Cited

U.S. PATENT DOCUMENTS 6,687,732 B1 * 2/2004 Bector .................... H04L 61/00
709/200
8,225,041 B2   7/2012 Fujita et al.
(Continued)

FOREIGN PATENT DOCUMENTS

EP      3121725    1/2017
RU      91213      1/2010
(Continued)

OTHER PUBLICATIONS

Kensuke Fukuda et al., "Detecting Malicious Activity With DNS Backscatter Over Time," 2017, pp. 3203-3218. (Year: 2017).*
(Continued)

*Primary Examiner* — Luu T Pham
*Assistant Examiner* — Canh Le
(74) *Attorney, Agent, or Firm* — ArentFox Schiff LLP; Michael Fainberg

(57) ABSTRACT

Systems and methods for detecting malicious activity in a computer system. One or more graphs can be generated based on information objects about the computer system and relationships between the information objects, where the information objects are vertices in the graphs and the relationships are edges in the graphs. Comparison of generated graphs to existing graphs can determine a likelihood of malicious activity.

18 Claims, 4 Drawing Sheets

(56) References Cited

U.S. PATENT DOCUMENTS

| | | | |
|---|---|---|---|
| 8,931,092 | B2 | 1/2015 | Wyschogrod et al. |
| 9,148,441 | B1 | 9/2015 | Tamersoy et al. |
| 9,225,730 | B1* | 12/2015 | Brezinski ............... G06F 21/00 |
| 9,413,773 | B2 | 8/2016 | Striem Amit et al. |
| 9,886,581 | B2 | 2/2018 | Olson et al. |
| 9,928,366 | B2 | 3/2018 | Ladnai et al. |
| 9,967,265 | B1 | 5/2018 | Peer et al. |
| 9,967,267 | B2 | 5/2018 | Ladnai et al. |
| 10,015,192 | B1 | 7/2018 | Stiborek et al. |
| 2006/0013132 | A1* | 1/2006 | Garnett ............... H04L 49/90 370/229 |
| 2009/0113156 | A1 | 4/2009 | Fujita et al. |
| 2009/0300150 | A1 | 12/2009 | Rudy et al. |
| 2012/0110263 | A1 | 5/2012 | Fujita et al. |
| 2012/0323829 | A1 | 12/2012 | Stokes et al. |
| 2014/0059684 | A1 | 2/2014 | Wyschogrod et al. |
| 2015/0244734 | A1 | 8/2015 | Olson et al. |
| 2016/0057159 | A1 | 2/2016 | Yin et al. |
| 2016/0105454 | A1 | 4/2016 | Li et al. |
| 2017/0132498 | A1* | 5/2017 | Cohen ............... G06N 5/022 |
| 2017/0154445 | A1 | 6/2017 | Maruhashi |
| 2017/0300593 | A1* | 10/2017 | Inoue ............... G06F 16/9024 |
| 2017/0300690 | A1* | 10/2017 | Ladnai ............... G06F 21/56 |
| 2017/0337375 | A1* | 11/2017 | Quinlan ............... G06F 21/53 |
| 2017/0374057 | A1* | 12/2017 | Petrovichev ........ H04L 63/0823 |
| 2018/0048662 | A1 | 2/2018 | Jang et al. |
| 2018/0069937 | A1 | 3/2018 | Kolleri |
| 2018/0196861 | A1 | 7/2018 | Lee et al. |
| 2018/0198805 | A1 | 7/2018 | Vejman et al. |
| 2018/0211037 | A1 | 7/2018 | Boutnaru |
| 2018/0211047 | A1 | 7/2018 | Olson et al. |
| 2018/0219888 | A1 | 8/2018 | Apostolopoulos |
| 2018/0227133 | A1 | 8/2018 | Yang et al. |
| 2018/0293400 | A1* | 10/2018 | Borup ............... G06F 21/554 |
| 2018/0365289 | A1* | 12/2018 | Brown ............... G06F 16/24535 |
| 2019/0036946 | A1* | 1/2019 | Ruvio ............... H04W 12/106 |
| 2019/0050562 | A1* | 2/2019 | Rhee ............... G06F 21/566 |
| 2019/0215329 | A1 | 7/2019 | Levy |

FOREIGN PATENT DOCUMENTS

| | | |
|---|---|---|
| RU | 2654151 | 5/2018 |
| WO | WO 2013/184211 | 12/2013 |
| WO | WO 2016/081661 | 5/2016 |

OTHER PUBLICATIONS

Tobias Wuchner et al., "Malware Detection with Quantitative Data Flow Graphs," 2014, pp. 271-282 (Year: 2014).*

Office Action corresponding to JP 2018-227133 dated Jul. 5, 2022.

European Search Report for European Application No. 18206739 date of completion May 17, 2019.

Russian Search Report for RU2018123685 dated Jun. 29, 2018.

European Office Action for European Application No. 18206739. 7-1213 dated Sep. 11, 2020.

Monowar et al., "Network Anomaly Detection: Methods, Systems and Tools", IEEE Quarter 2014. pp. 303-336.

Kartik et al., "A Globally-Variant Locally-Constant Model for Fusion of Labels from Multiple Diverse Experts without Using Reference Labels, ", Apr. 2013. pp. 769-783.

European Office Action for European Application No. 18206739. 7-1213 dated May 17, 2019.

Application and File History for U.S. Appl. No. 16/146,142, filed Sep. 28, 2018, inventor Soumenkov et al.

* cited by examiner

DETECTING MALICIOUS ACTIVITY IN A COMPUTER SYSTEM USING COMPUTER SYSTEM OBJECTS

RELATED APPLICATIONS

This continuation application claims the benefit of U.S. patent application Ser. No. 16/146,142 filed Sep. 28, 2018, which claims the benefit of Russian Application No. 2018123685, filed Jun. 29, 2018, each of which are fully incorporated by reference herein.

TECHNICAL FIELD

Embodiments relate generally to information security assurance technologies, and more specifically, to detecting malicious activity in a computer system.

BACKGROUND

Rapid development of computer technologies in the last decade, along with wide spreading of various computing devices (personal computers, notebooks, tablets, smartphones, etc.) has become a powerful incentive to use such devices in various areas of activity and for a large number of tasks (from Internet surfing to bank transfers and electronic document/record keeping). In parallel with the growth of the number of computer devices and volumes of software operating on such devices, the number of malicious programs that take advantage of these devices and technologies has grown rapidly as well.

Currently, there are a number of different types of malicious programs. Some programs steal personal and confidential data from user devices (e.g. logins and passwords, banking information, electronic documents). Other programs utilize user devices to build so-called botnets, in order to carry out attacks such as DDoS—Distributed Denial of Service, or for exhaustive (brute force) cracking of passwords with transfer to other computers or computer networks. Still other programs offer users paid content through intrusive advertising, paid subscriptions, texting to toll numbers, and so on.

Some anti-virus programs have been devised to counter the above-described threats. However, in some situations, anti-virus programs are ineffective. For example, in the case of target-focused cyber attacks on computer systems (APT—advanced persistent threat), and in cases where anti-virus programs do not operate in the computer system (e.g. were not installed or were disabled) at the time the system was infected, anti-virus programs can be ineffective.

In certain situations, determining whether a computer system is infected requires a resource-consuming analysis of the state of computer system, analysis of computer system behavior logs, analysis of the data sent and received on the computer network, analysis of user actions, etc. Often, the aforementioned work is done manually, which is time-consuming and labor-intensive.

U.S. Pat. No. 8,225,041 describes a performance history management method and system. For example, operational characteristics of the computer system are analyzed, and the results are used to build links between the data in the computer system. Based on the links that are built, the performance history of the computer system is restored. U.S. Pat. No. 8,225,041 successfully handles restoring and linking scattered data collected in computer systems, but cannot handle analyzing the state of a computer system based on the detected links between the data. In general, the objects in graphs created by methods and systems such as U.S. Pat. No. 8,225,041, are treated as simple objects showing only the direction or sequence of objects. No mathematical operations are considered. Such systems are insufficient to detect malicious activity because the complexity of such a task grows in a non-linear way with an increase in the number of objects.

Therefore, there is a need to detect malicious activity in a computer system more efficiently using determinations of the state of the computer system at any moment of time or at any moment of execution.

SUMMARY

In an embodiment, a system for detecting malicious activity in a computer system comprises a computing platform including computing hardware of at least one processor and memory operably coupled to the at least one processor; and instructions that, when executed on the computing platform, cause the computing platform to implement: a gathering tool configured to collect a plurality of information objects about the computer system, and determine a plurality of relationships between the plurality of information objects, a graph-building tool configured to build at least a first intermediate graph and a second intermediate graph based on the plurality of information objects and the plurality of relationships, wherein the first and second intermediate graphs are formed with the plurality of information objects as vertices and the plurality of relationships as edges, and build a final graph based on the at least first and second intermediate graphs, wherein the final graph includes at least one vertex from the first intermediate graph and at least one vertex from the second intermediate graph and at least one edge connecting the at least one vertex from the first intermediate graph and at least one vertex from the second intermediate graph, a search tool configured to select, from a graphs database, at least one preexisting graph similar to the final graph based on a degree of similarity threshold, the at least one preexisting graph assigned a malicious activity ratio, an analysis tool configured to determine malicious activity based on the at least one preexisting graph.

In an embodiment, a method for detecting malicious activity in a computer system comprises collecting a plurality of information objects about the computer system; determining a plurality of relationships between the plurality of information objects; building at least a first intermediate graph and a second intermediate graph based on the plurality of information objects and the plurality of relationships, wherein the first and second intermediate graphs are formed with the plurality of information objects as vertices and the plurality of relationships as edges; building a final graph based on the at least first and second intermediate graphs, wherein the final graph includes at least one vertex from the first intermediate graph and at least one vertex from the second intermediate graph and at least one edge connecting the at least one vertex from the first intermediate graph and at least one vertex from the second intermediate graph; selecting, from a graphs database, at least one preexisting graph similar to the final graph based on a degree of similarity threshold, the at least one preexisting graph assigned a malicious activity ratio; and determining malicious activity based on the at least one preexisting graph.

In an embodiment, a system for determining a characteristic of a computer system comprises a computing platform including computing hardware of at least one processor and memory operably coupled to the at least one processor; and instructions that, when executed on the computing platform, cause the computing platform to implement a graph-building tool configured to receive a plurality of information objects about the computer system and a plurality of relationships between the plurality of information objects, build a first graph including at least two of the plurality of information objects as vertices and at least one of the plurality of relationships as edges, build a second graph including the at least two of the plurality of information objects, build a unified graph based on the first graph and the second graph, wherein the unified graph includes all identical information objects shared between the first graph and the second graph, and an analysis tool configured to determine a characteristic of the computer system based on the unified graph.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
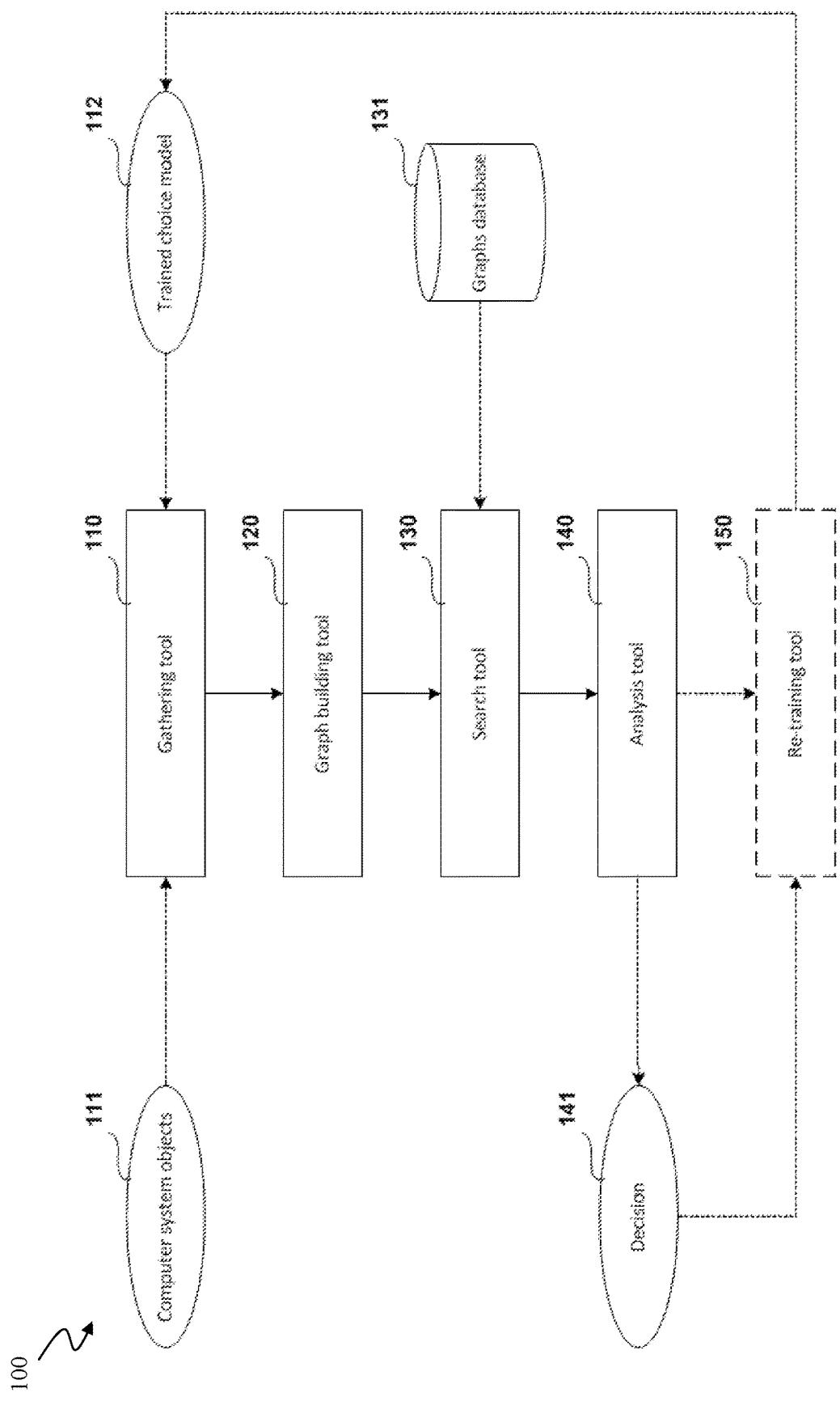
FIG. 1 is a block diagram of a system for detecting malicious activity in a computer system, according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

In an embodiment, a functional relationship means a type of relation (relationship) between objects in which changes of each object are concurrent to each other. In a functional relationship, the main indicators of a cause and effect relationship are absent, particularly productivity (the objects do not produce each other), asymmetry in time (objects coexist, one of them does not precede another), and irreversibility.

Referring to FIG. 1, a block diagram of a system 100 for detecting malicious activity in a computer system is depicted, according to an embodiment. In an embodiment, system 100 generally includes a gathering tool 110, a trained choice model 112, a graph building tool 120, a graph database 131, a search tool 130, and an analysis tool 140. Optionally, system 100 can include a re-training tool 150. As will be described, system 100 operates on computer system objects 111 and will include one or more decisions 141.

Gathering tool 110 is configured for collecting information about the computer system objects 111 (hereinafter, "information on objects" and "objects", respectively), and determining the relationship between the objects 111 on the basis of an analysis of the gathered information. In an embodiment, each relationship is matched with the relationship's degree of reliability. In an embodiment, gathering tool 110 is further configured for sending information about the gathered objects 111 and about the determined relationships to the graph building tool 120.

For example, the gathering or collecting of information about computer system objects by gathering tool 110 can be performed using a special-purpose driver installed in the computer system and by ensuring interception of data being transmitted between processes, on a network, etc.

In an embodiment, objects 111 can include: files; network packets; websites; pages of a random access memory, both a physical and virtual; processes and operating system objects related to processes; operating system events; entries in operating system logs or application logs; entries in the MFT (master file table); or entries in the operating system registry.

For example, a website acting as an object 111 can be an address, e.g. "http://google.com" or "http://files.downloads.com/chrome.exe".

In yet another example, the "system.evtx" operating system log contains the following entry as object 111:

Record #299185 2017.10.26-17:29:18 'Computer':'DC3.hq.msk',
'Channel': 'System',
'EventSourceName':'Service Control Manager',
'Guid':'{555908d1-a6d7-4695-8e1e-26931d2012f4}',
'Name': 'Service Control Manager',
'xmlns':'http://schemas.microsoft.com/win/2004/08/events/event',
'Level' :04,
'Opcode':00,
'Task' :0000,
'EventID':7036 (The service entered the new state.),
'Qualifiers' :16384,
'Keywords' :8080000000000000,
'SystemTime':2017.11.25-18:29:18,
'ProcessID':00000524,
'ThreadID':00003420,
'EventRecordID':00000000000299185,
'Version' :00, 'param1':'WinHTTP Web Proxy Auto-Discovery Service',
'param2':'running',
'Binary':570069006E004800740074007000410075007400 6F0050 0072006F007800790053007600630 02F0034000000, The "system.evtx" operating system log includes a combination of "key"-"value" pairs describing a system event.

In an embodiment, the information on the objects 111 represents data which can uniquely characterize the object 111 and can be used as a basis to make a conclusion regarding the existence of a relationship between the object 111 and another object 111.

The following examples illustrate information about objects 111. In an example, information about files can include a file name, a path to the file, or a file size. In another example, information about a process can include a process ID, IDs of parent and child processes, or a name of the application which created the process. In another example, information about network packets can include a network packet receipt or sending address, a network packet size, a type, size, or convolution of data contained in the network packet, or a name of the application receiving or sending the network packet. In another example, a random access memory page can include a type, size, or flag of the random access memory page, a size, position, type, or convolution of data in the random access memory page, or an ID of the process and names of the application working with or operating on data in the specified random access memory page. In another example, an entry in an operating system log can include a key such as a value where the parameter's name acts as the key and the parameter's value acts as the value.

For example, the operating system registry (which can be viewed as one of the operating system logs) can contain the following entry:
ImagePath              REG_EXPAND_SZ% systemroot%\KtknjRrl.exe
In this example, the "ImagePath" field name acts as the key, and the pair of values "field type"-"REG_EXPAND_SZ%", "field value"-"systemroot%\KtknjRrl.exe" acts as the key's value.

In yet another embodiment, the relationship between the objects 111 is a logical or functional relationship. In one particular embodiment, for example, the relationship between objects can be a binary relation. A logical relationship can occur when two objects 111 are used together, while possibly being unrelated to each other (for example, a network packet and an operating system event "write file to disc"). A functional relationship can occur when one object 111 is used for the analysis of another object 111 (for example, websites and network packets).

In yet another embodiment, the relationship between two objects 111 is established if a condition is met when at least the first object processes the data provided by the second object. For example, in an inter-process communication, (IPC), where, in one of the cases, the first process reads data from the memory of the second process, the first object uses the second object, such as when a program uses a DLL library for its own operation. In another example, where the first and the second object are used by a third object, such as if the program uses two independent DLL libraries (i.e. DLL libraries where the functions of one library do not use the functions of the other library). In another example, the aforementioned objects can have at least one identical parameter characterizing them, such as a file name acting as a parameter.

Continuing this example, when a service is created, the following is executed: first, the "KtknjRrl.exe" file is written to the hard drive; the information about it is written to the MFT:
inode 3751 MACB 09/03/2016 18:42:05 Size 56320
Additionally, data about the executed operation are written to the events log:

09.03.2016 22:42:05 -
Service Name: ffKu
Service File Name: %systemroot%\KtknjRrl.exe Service Type: user mode service Service Start Type: auto start Service Account: LocalSystem Further, the data about the created service are written to the registry:

HKLM\SYSTEM\ControlSet001\services\ffKu
Type           REG_DWORD         0x00000010
Start          REG_DWORD         0x00000002
ErrorControl   REG_DWORD         0x00000000
ImagePath      REG_EXPAND_SZ %   systemroot%\KtknjRrl.exe
DisplayName    REG_SZ            ffKu
ObjectName     REG_SZ            LocalSystem
HKLM\System\ControlSet001\Control\Sessiona
Manger\AppCompatCache\AppCompatCache All three entries are united by the "KtknjRrl.exe" file name, which acts as the common parameter for the MFT, the event log and the registry.

In yet another example, a user using the "chrome.exe" browser downloads a "drivers.zip" archive from the "http://files.com" website. From the archive, the user then retrieves the driver.sys file using the WinZip application. In this example, it can be determined that the "driver.sys" file is directly related to the "drivers.zip" file and indirectly related to the "chrome.exe" browser. The following are thus the objects 111: Object No. 1: the "chrome.exe" browser; Object No. 2: the "drivers.zip" archive; Object No. 3: the "driver.sys" file; Object No. 4: the "http://files.com" website.

In general, the following relationships can be identified in the foregoing example:

«driver.sys» → «driver.zip»
«driver.sys» → «http://files.com»
«driver.sys» → «chrome.exe»
«drivers.zip» → «http://files.com»
«drivers.zip» → «chrome.exe»
«http://files.com» → «chrome.exe»

In yet another example showing relationships between objects 111, various services of the Windows operating system write data about their operation to the "system.evtx" operating system log in the following format: "[entry id] [time] [process] [event] [parameters]". Accordingly, the operating system log can contain the following entries:

1252, «1527076481», «explorer.exe», «write file», «data.dat»
...
1261, «1527076516», «hsayy.exe», «read file», «data.dat»

In this case, embodiments of the system can determine that the "hsayy.exe" process is related to the "explorer.exe" process, because a predetermined condition was met that connected two different objects 111; specifically, the same "data.dat" file was written and read with a 30-second difference.

In yet another embodiment, a degree of reliability of the relationship between two objects 111 can characterize the probability that one of the objects 111 has a logical or functional relationship with another of the objects 111. In an embodiment, the degree of reliability can comprise a numerical value.

For example, the degree of reliability of a relationship can be a valid numerical value ranging from 0.0 to 1.0, where a 0.0 value means that the objects 111 are definitely unrelated, while 1.0 guarantees that a relationship between the above-mentioned objects 111 exists.

Therefore, if the degree of reliability of the relationship between objects 111 is not the maximum possible value (for example, not 1.0 in the above-described example), then the determination of a relationship between the objects 111 is probabilistic, and the relationship is often determined not strictly but based on the accumulated experience and statistical data on the relationship between the above-mentioned objects 111. In an example, even though the statement that two objects 111 created within a 0.1 second difference are related to each other (for example, created during software installation) is an assumption, it has a high degree of reliability, based on the volume of accumulated statistical data about the operating system's functioning and the installation of various software.

In yet another embodiment, a transfer of information from the gathering tool 110 to the to the graph building tool 120 about gathered objects 111 and the determined relationships is made only if the degree of reliability of the determined relationship between the gathered objects 111 exceeds a predetermined threshold value.

In yet another embodiment, the objects 111 about which the gathering tool 110 collects information and between which it determines the relationships are chosen using a trained choice model 112. The trained choice model 112 can be built in advance, using machine training methods and based on a training sample comprising computer systems whose behavior is known in advance (malicious or safe). Thus, the number of objects 111 being chosen is minimized, and the accuracy of decisions made by the analysis tool 140 based on the analysis of the information about the objects 111 and the relationships between them is maximized. This approach allows for a reduction in the consumption of computing resources (memory, processor time, etc.) needed to detect malicious activity in a computer system while maintaining the accuracy of the decision(s) being made.

Since, subsequently, both the objects 111 themselves (information on objects) and the relationships between the objects 111 are used to detect malicious activity in the computer system, it is convenient to represent multiple identified objects 111 and multiple identified relationships between the identified objects 111 as elements of a graph. In an embodiment, a graph is a mathematical object that can be processed using a specially developed extensive multi-functional theory (the theory of graphs), while reducing the analysis to the solving of mathematical problems.

A graph is an abstract mathematical object that can include an array of graph vertices and a set of edges, i.e. connections between vertex pairs. For example, the array of vertices can be represented by multiple objects 111, while the set of edges can be represented by multiple logical and functional relationships between the identified objects 111.

For different fields of application, graph types can vary in direction, limitations in the number of relationships, and additional data on vertices or edges. Many structures presenting practical interest in mathematics and information science can be represented by graphs. For example, a computer system can be simulated using a directed graph where, as mentioned above, the vertices represent objects 111 (described with a combination of parameters which are information about the objects 111), while the edges (directed edges) are logical and functional relationships between the objects 111. In certain embodiments, each edge (relationship) can be assigned a weight (the relationship's degree of reliability) such that a weighted directed graph can be built.

Accordingly, the graph building tool 120 is configured for building at least two graphs based on the information about the obtained relationships. In embodiments, the graph(s) diameter can be less than a specified parameter. In certain embodiments, these are named intermediate graphs. In an embodiment, the objects 111 represent the graph's vertices, while the identified relationships represent the graph's edges. The graph building tool 120 is further configured for building a final graph based on the intermediate graphs, so that the final graph includes at least one vertex from both the first and the second graph and one edge connecting said vertices. The graph building tool 120 is further configured for sending the built final graph to the search tool 130 and/or the analysis tool 140.

For example, in a computer system defined as a distributed system of clients, then, on the basis of the objects 111 gathered from each client and of the identified relationships between such objects 111, graphs are built for each client. Then, the final graph that is built is optimized in order to reduce the number of graph edges (i.e. relationships between the objects 111).

For example, when a graph is optimized, certain components can be eliminated from the graph, including vertices having predetermined properties (for example, objects of specified types that have specified parameters), edges with predetermined properties (for example, relationships between objects based on the object creation time), or duplicated edges.

In yet another embodiment, the number of intersections between the edges of the final graph is minimized, where the quantity of intersections between the graph edges (the number of graph intersections) is the lowest number of elements in the representation of the graph as a graph of intersection between finite sets, or, equivalently, the lowest number of clicks required to cover all the graph's edges).

In an alternative embodiment, graph building tool 120 is configured for building a graph based on the information about the obtained relationships, wherein the graph vertices are represented by the objects 111 and the graph edges are represented by the identified relationships such that the graph's diameter is less than a predefined parameter, and the graph contains at least one vertex from the first and the second graph and one edge connecting the vertices. The graph building tool 120 is further configured for sending the built final graph to the search tool 130 and/or the analysis tool 130.

In yet another embodiment, the graph building tool 120 is configured to build multiple final graphs (i.e. at least two) based on multiple intermediate graphs (i.e. at least three). In embodiments, the number of final graphs can be specified or predetermined.

For example, during an analysis of a computer system which is a distributed system (e.g., personal computers grouped into a local area network), multiple graphs are built for each computer (in fact, an independent element of the computer system). Then, on the basis of the graphs built for each computer, one final graph is built for each, and the totality of the built final graphs is sent to the search tool 130.

In yet another example, in a computer system that is a distributed system, a graph can be built on the basis of the information about the objects 111 of the computer system. In embodiments, user names and their respective IP addresses can be utilized, which are included in the entries of the "security.evtx" operating system logs. As a result, for example, the following string of actions (a directed graph) occurs:

---
User #1 created a file on Computer #1 → . . .
. . . → User #1 passed authentication from Computer #2 → . . .
. . . → on Computer #2, User #1 impersonated from User #2 → . . .
. . . → User #2 passed authentication from Computer #3, and so on.

---

Accordingly, the problem of treating graph objects as simple objects with only a direction or sequence of objects as described by existing systems is solved by the aforementioned operations and treatment of graph objects and their relationships. Further, systems and methods solve the problem of resource usage (graph complexity growing in a non-linear way with an increased number of objects) by the aforementioned optimizations.

The search tool 130 is configured for selecting or choosing, from a graphs database 131, at least one graph whose degree of similarity to the obtained graph exceeds a predetermined level. In such an embodiment, pre-built graphs of the computer system's activity can be stored in the graphs database 131, wherein each graph is assigned a malicious activity ratio based of the analysis of the activity. The search tool 130 is further configured for sending the selected or chosen graph to the analysis tool 140.

In one embodiment, the graphs database 131 is supplemented in advance with graphs with known malicious activity built on the basis of the objects 111 chosen from computer systems. In this case, such graphs are built using the above-described gathering tool 110 and the graph building tool 120.

In yet another embodiment, the graphs database 131 is supplemented with graphs built on the basis of the objects 111 chosen from computer systems included in the training sample used for machine training of the choice model 112.

In yet another embodiment, the graphs database 131 stores not the graphs built as described above, but a function, operation, or convolution of the graph, or both. In this case, the search tool 130 additionally computes a function based of the graph received from the graph building tool 120, and performs a search in the graphs database 131 by comparing the computed function of that graph with the graph functions stored in the database. In an embodiment, a fuzzy hash is used as the computed function of the graph.

In yet another embodiment, graph building tool 120 is configured to determine the degree of isomorphism of graphs and determine the degree of similarity between graphs based on the degree of isomorphism.

The analysis tool 140 is configured for making a decision 141 on the identification of malicious activity in a computer system on the basis of the results of analysis of graphs received from the graph building tool 120 and from the search tool 130.

In one embodiment, the decision 141 on the identification of malicious activity in the computer system is made by analyzing the maliciousness ratio of at least one graph found in the graphs database and the degree of similarity of that graph to the built graph. For example, the final maliciousness rate of a computer system under analysis can be calculated using the following formula:

$$w = \prod_{i=1}^{N}\left(1 - \prod_{j=1}^{M}(1 - c_{\{i,j\}} \times w_j)\right)$$

where:
- w is the maliciousness ratio of the computer system under analysis;
- $w_j$ is the maliciousness ratio of graph j chosen from the graphs database 131;
- $c_{\{i,j\}}$ is the degree of similarity between the built graph i and graph j chosen from the graphs database 131;
- N is the number of graphs built for the computer system under analysis;
- M is the number of graphs chosen from the graphs database 131.

In another example, the maliciousness ratio w of the computer system under analysis can range from 0.0 (no malicious activity occurring in the computer system) to 1.0 (malicious activity did occur in the computer system). If the above-mentioned maliciousness ratio $w_m$ exceeds a predetermined value (for example, 0.75), the analysis tool 140 can decide that malicious activity is detected in the computer system under analysis.

In yet another embodiment, based on an analysis of a built graph, the analysis tool 140 is configured to identify the object 111 that is the source of the malicious activity in the computer system.

Optional re-training tool 150 is configured for re-training the choice model 112 on the basis of the decision 141 made by the analysis tool 140. In an embodiment, during the next analysis of the same computer system for maliciousness, the building of graphs by the graph building tool 120 on the basis of the analysis of the objects 111 chosen by the gathering tool 110 is optimized. For example, the number of the objects 111 chosen is minimized, while the accuracy of the decision being made by the analysis tool 140 on the basis of the analysis of information about the objects 111 and of the relationships between objects 111 is maximized. In another example, the consumption of computing resources for the building of graphs by the graph building tool 120 (e.g. in the second instance of the analysis tool 140) is lower than when chosen using the non-retrained model (e.g. in the first instance of the analysis tool 140).

In operation, system 100 can be utilized to detect malicious activity in a computer system with the following example. A user takes the following sequential actions: First, the user connects to a remote computer upon entering a password. Then, the user creates a new service, which, in turn, causes the following changes in the computer system: creation of a service modifies the registry; the service launches Powershell; and Powershell creates a file.

The gathering tool 110 then gathers information on the computer system's objects 111:
- Object #1—entry in the log;
- Object #2—entry in the log;
- Object #3—key in the registry;
- Object #4—entry in the log;
- Object #5—creation of a file in the file system.

The graph building tool 120, on the basis of the gathered objects 111, builds relationships using the following data:

---

Object #1 (entry in the log) → [relationship by user name] → . . .
. . . → Object #2 (key in the registry) → [relationship by service name] → . . .
. . . → Object #3 (key in the registry) → [relationship by file name in the registry key]
→
. . .
. . . → Object #4 (entry in the log) → [relationship by file name in the log] → . . .
. . . → Object #5 (creation of a file in the file system).

---

Figure 2:
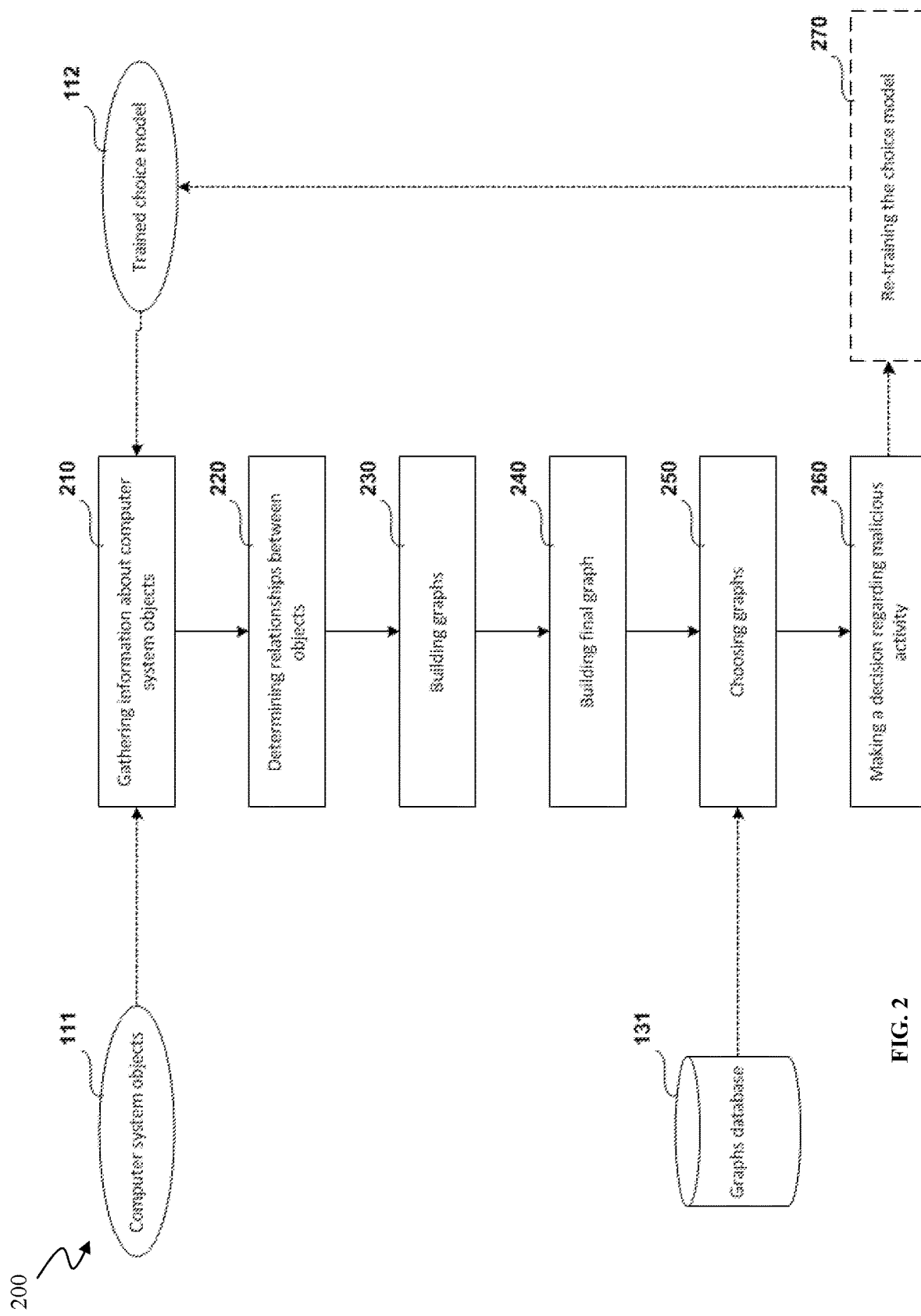
FIG. 2 is a flowchart of a method for detecting malicious activity in a computer system, according to an embodiment.

Referring FIG. 2, a flowchart of a method 200 for detecting malicious activity in a computer system is depicted, according to an embodiment. Method 200 includes Stage 210, at which information is gathered about the objects of the computer system; Stage 220, at which relationships between the objects are identified; Stage 230, at which graphs are built; Stage 240, at which a final graph is built; Stage 250, at which graphs are chosen; Stage 260, at which a decision about malicious activity is made; and Stage 270, at which the choice model is re-trained.

More particularly, at stage 210, information is gathered about the objects 111 of the computer system. In an embodiment, the choice of objects 111 is made using the trained choice model 112.

At Stage 220, the relationship between the objects 111 is determined based on an analysis of the gathered information. In certain embodiments, each relationship is matched with a degree of reliability. In a particular embodiment, the objects 111 whose relationships' degree of reliability is lower than a predetermined threshold value are excluded from further analysis for maliciousness. This allows for the reduction of computing resources used to analyze the computer system for maliciousness.

At Stage 230, at least two (intermediate) graphs are built based on the identified relationships (including the use of the relationship's determined degree of reliability). In an embodiment, the intermediate graph(s) diameter can be less than a specified parameter. The objects 111 are presented as a graph's vertices, while the identified relationships represent the graph's edges.

At Stage 240, a final graph is built based on the previously-built intermediate graphs. In an embodiment, the final graph includes at least one vertex from both the first and the second graph and one edge connecting the vertices.

At Stage 250, at least one graph is chosen from the graphs database 131 whose degree of similarity to the built final graph exceeds a predetermined level. Each pre-built graph can include an assigned malicious activity ratio based of the analysis of said activity of the computer system and stored in the graphs database 131.

At Stage 260, a decision about the detection of malicious activity in the computer system is made based on the results of the analysis of the built graph and the chosen graph.

At Stage 270, the trained choice model 112 is re-trained on the basis of the decision 141 made at Stage 260 so that, during the subsequent analysis of the same computer system for maliciousness, at least the following would occur for the building of graphs at Stage 230 on the basis of the analysis of the objects 111 chosen at Stage 210: the number of the objects 111 being chosen is minimized, while the accuracy of the decision made at Stage 260 on the basis of the analysis of information about the objects 111 and of the relationships between them is maximized; and/or the consumption of computing resources for the building of graphs at Stage 230 is lower than for the building of graphs using objects 111 chosen when using the non-retrained model.

Figure 3:
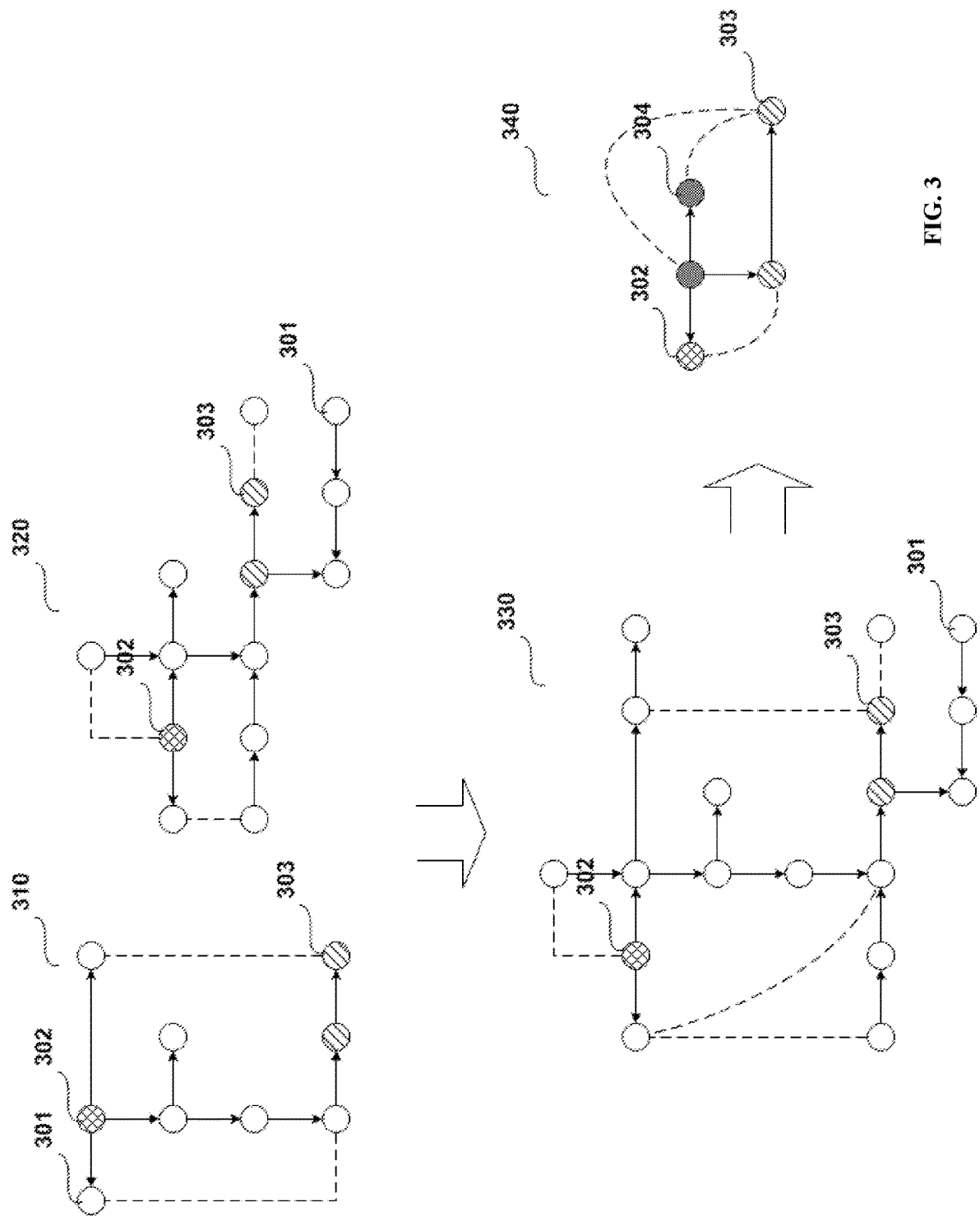
FIG. 3 is example block diagrams of graphs built based on an analysis of links between the objects of a computer system, according to an embodiment.

Referring to FIG. 3, example block diagrams of graphs built based on an analysis of links between the objects of a computer system are depicted, according to an embodiment. The example diagrams for building a graph on the basis of an analysis of relationships between the computer system objects 111 includes the initially built graphs 310 and 320, a unified graph 330, and an optimized graph 340. In each graph, computer system objects 301, 302, 303 act as the graph's vertices.

In this case, objects 301 can be viewed as different objects (for convenience, they are grouped under a single index, while being different in substance), while objects 302 and 303 are identical. The initial graphs 310 and 320 are built on the basis of analysis of the gathered objects 301, 320, 303, and of the identified relationships between them.

In FIG. 3, solid edges show functional relationships between objects 111, dotted edges show logical relationships, arrows show the linking object and the linked object (i.e. the arrow goes from the first object 111 that created the relationship to the second object 111 that became related to the first object 111). For example, if a file is selected from an archive, the arrow will show the functional relationship from the archive to the selected file.

As described herein, the gathering tool 110 is used to gather information about the objects of the computer system 111. In an embodiment wherein the computer system is composed of multiple independent components (e.g., client and server), objects 111 gathered from different independent components can also be considered independent. Multiple initial graphs can be built in this manner.

In another example wherein the computer system is unitary (contains only one independent component), all gathered objects 111 can be considered dependent. However, gathered objects 111 also can be divided into multiple relatively independent groups (with a small number of relationships), for which multiple initial graphs can be built (one graph for each group).

In a computer system running a malicious program which allows for remote ("backdoor") control of the computer system, the malicious program receiving commands from the "owner" can take malicious or unauthorized actions. For example, a malicious program can receive two different commands, "encrypt documents" and "obtain passwords". Both actions are independent and can be performed by different modules of the malicious program. During the analysis of such a computer system, two independent graphs can be built. In a first graph, objects 111 are mostly represented by files (documents). In a second graph, objects 111 are represented by entries in operating system logs. Regardless, it is possible to track the relationship between the two graphs by network activity (which will also be reflected in operating system logs), by source of activity (malicious program modules), by activity start time, by network packets, etc.

The graph building tool 120 builds initial graphs 310 and 320 such that that graphs 310 and 320 contain (as their vertices) at least two identical or similar objects 111 (similar objects are objects in which at least one parameter differs by a value not exceeding the specified one). For example, initial graph 310 contains two identical objects 303.

Unified graph 330 is built based on previously built initial graphs 310 and 320. The graph building tool 120 builds a unified graph 330 so that it includes all identical or similar objects 111 present in all initial graphs used as a basis to build the unified graph 330. For example, the unified graph 330 includes all objects 302 and 303 present in the initial graphs 310 and 320.

The unified graph 330 can be considered a final graph on which the search tool 130 can perform a subsequent analysis. However, to ensure that the system for detecting malicious activity in a computer system is less demanding in terms of computer resources (space in the graphs database, computing resources for building, searching and analyzing graphs, etc.), the graph building tool 120 performs optimization of the unified graph 330 and builds an optimized graph 340 in certain embodiments.

An optimized graph 340 is built on the basis of the previously-built unified graph 330. The graph building tool 120 builds the optimized graph 340 to include all identical or similar objects 111 present in all initial graphs and the unified graph. For example, the optimized graph 340 includes all objects 302 and 303 present in the initial graphs 310 and 320 and in the unified graph 330. In this case, all objects and relationships (vertices and edges) not related to the above-mentioned objects 111 can be deleted from the optimized graph 340 (they are marked as unfilled circles 301). Therefore, after optimization, in addition to the aforementioned objects 302 and 303, objects 304 can be detected, between which a relationship is established which was not detectable earlier during the building (or analysis of) initial graphs 310 and 320. As illustrated, the optimized graph 340 is more compact than unified graph 330 and therefore subsequent work with the optimized graph is favorable over initial graphs 310 and 320 or unified graph 330.

Figure 4:
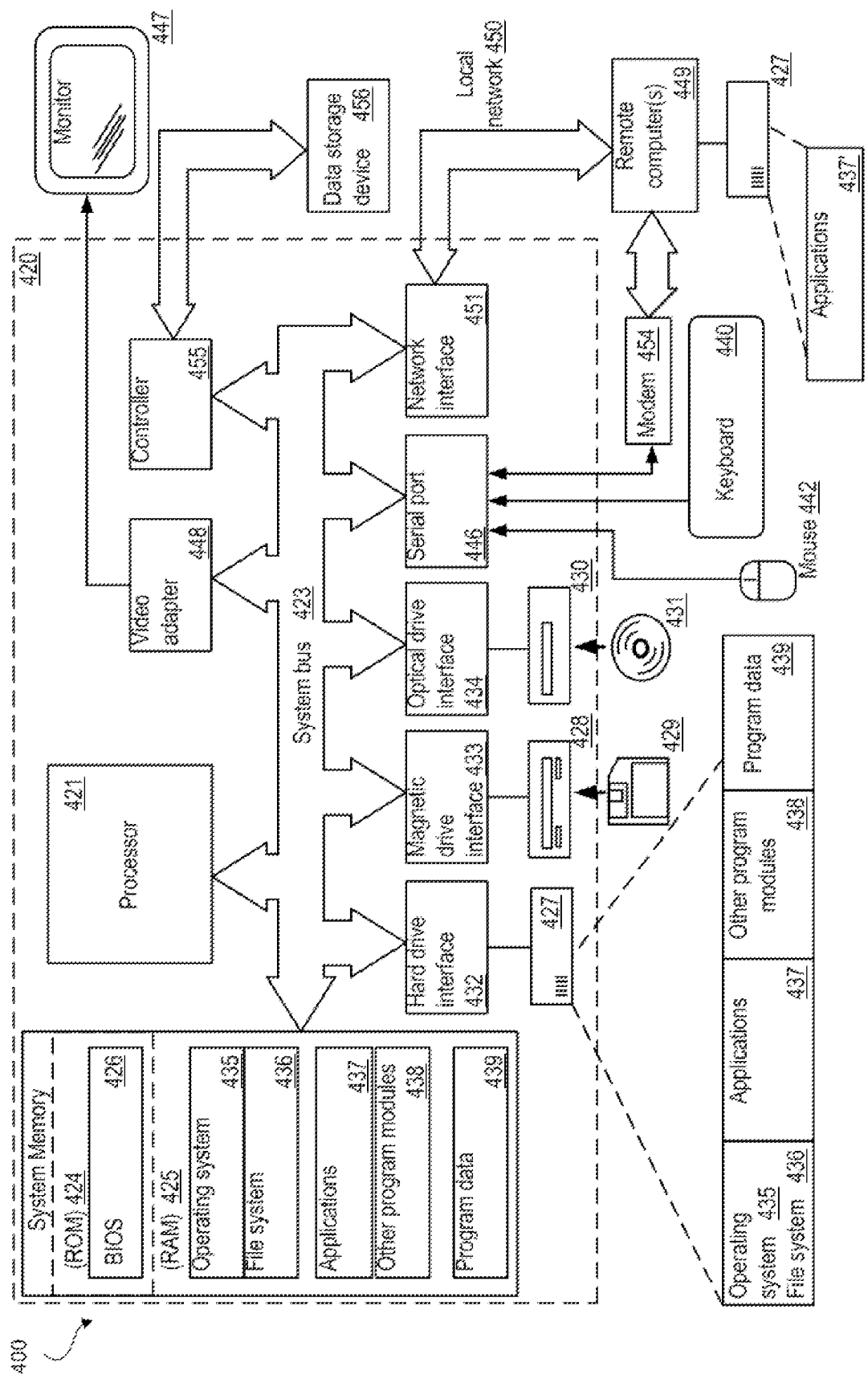
FIG. 4 is a block diagram of a computer system configured to implement embodiments.

Referring to FIG. 4, a diagram illustrating in greater detail a computer system 400 on which aspects of the invention as described herein may be implemented according to various embodiments is depicted.

The computer system 400 can comprise a computing device such as a personal computer 420 includes one or more processing units 421, a system memory 422 and a system bus 423, which contains various system components, including a memory connected with the one or more processing units 421. In various embodiments, the processing units 421 can include multiple logical cores that are able to process information stored on computer readable media. The system bus 423 is realized as any bus structure known at the relevant technical level, containing, in turn, a bus memory or a bus memory controller, a peripheral bus and a local bus, which is able to interact with any other bus architecture. The system memory can include non-volatile memory such as Read-Only Memory (ROM) 424 or volatile memory such as Random Access Memory (RAM) 425. The Basic Input/Output System (BIOS) 426 contains basic procedures ensuring transfer of information between the elements of personal computer 420, for example, during the operating system boot using ROM 424.

Personal computer 420, in turn, has a hard drive 427 for data reading and writing, a magnetic disk drive 428 for reading and writing on removable magnetic disks 429, and an optical drive 430 for reading and writing on removable optical disks 431, such as CD-ROM, DVD-ROM and other optical media. The hard drive 427, the magnetic drive 428, and the optical drive 430 are connected with system bus 423 through a hard drive interface 432, a magnetic drive interface 433 and an optical drive interface 434, respectively. The drives and the corresponding computer information media represent energy-independent means for storage of computer instructions, data structures, program modules and other data on personal computer 420.

The system depicted includes hard drive 427, a removable magnetic drive 429 and a removable optical drive 430, but it should be understood that it is possible to use other types of computer media, capable of storing data in a computer-readable form (solid state drives, flash memory cards, digital disks, random-access memory (RAM), etc.), connected to system bus 423 through a controller 455.

The computer 420 comprises a file system 436, where the recorded operating system 435 is stored, as well as additional program applications 437, other program engines 438 and program data 439. The user can input commands and information into the personal computer 420 using input devices (keyboard 440, mouse 442). Other input devices (not shown) can also be used, such as: a microphone, a joystick, a game console, a scanner, etc. Such input devices are usually connected to the computer system 420 through a serial port 446, which, in turn, is connected to a system bus, but they can also be connected in a different way—for example, using a parallel port, a game port or a Universal Serial Bus (USB). The monitor 447 or another type of display device is also connected to system bus 423 through an interface, such as a video adapter 448. In addition to monitor 447, personal computer 420 can be equipped with other peripheral output devices (not shown), such as speakers, a printer, etc.

Personal computer 420 is able to work in a network environment; in this case, it uses a network connection with one or several other remote computers 449. Remote computer(s) 449 is (are) similar personal computers or servers, which have most or all of the above elements, noted earlier when describing the substance of personal computer 420 shown in FIG. 4. The computing network can also have other devices, such as routers, network stations, peering devices or other network nodes.

Network connections can constitute a Local Area Network (LAN) 450 and a World Area Network (WAN). Such networks are used in corporate computer networks or in corporate intranets, and usually have access to the Internet. In LAN or WAN networks, personal computer 420 is connected to the Local Area Network 450 through a network adapter or a network interface 451. When using networks, personal computer 420 can use a modem 454 or other means for connection to a world area network, such as the Internet. Modem 454, which is an internal or an external device, is connected to system bus 423 through serial port 446. It should be clarified that these network connections are only examples and do not necessarily reflect an exact network configuration, i.e. in reality there are other means of establishing a connection using technical means of communication between computers.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A system for detecting malicious activity in a computer system, the system comprising:
   a computing platform including computing hardware of at least one processor and memory operably coupled to the at least one processor; and
   instructions that, when executed on the computing platform, cause the computing platform to implement:
      a gathering tool configured to:
         collect information about the computer system for a plurality of computer system objects, and
         determine a plurality of relationships between the plurality of computer system objects, wherein at least one of the plurality of relationships is determined using a degree of reliability characterizing the probability that two of the plurality of computer system objects have a logical or functional relationship, the relationship being logical when the two of the plurality of computer system objects are used together in the computer system, the relations hip being functional when a first of the two of the plurality of computer system objects is used for analysis of a second of the two of the plurality of computer system objects in the computer system,
      a graph-building tool configured to:
         build at least a first intermediate graph and a second intermediate graph based on the plurality of computer system objects and the plurality of relationships, wherein the first and second intermediate graphs are formed with the plurality of computer system objects as vertices and the plurality of relationships as edges, and
         build a final graph based on the at least first and second intermediate graphs, wherein the final graph includes at least one vertex from the first intermediate graph and at least one vertex from the second intermediate graph and at least one edge connecting the at least one vertex from the first intermediate graph and at least one vertex from the second intermediate graph to reduce the computing platform resource usage when the plurality of computer system objects grows non-linearly,
      wherein the gathering tool is implemented by a special-purpose driver on the computing platform, the special-purpose driver configured to intercept the information about the computer system from at least one of network traffic or a data exchange between two processes,
      a search tool configured to: select, from a graphs database, at least one preexisting graph similar to the final graph based on a degree of similarity threshold, the at least one preexisting graph assigned a malicious activity ratio,
      an analysis tool configured to determine malicious activity based on a comparison of the at least one preexisting graph and the final graph.

2. The system of claim 1, wherein the plurality of computer system objects are at least one of a file, a network packet, a website, a page of random access memory (RAM), a system process, an operating system object, an operating system event, an entry in an operating system log, an entry in an application log, an entry in a master file table (MFT), or an entry in an operating system registry.

3. The system of claim 1, wherein the degree of reliability of a relationship comprises a numerical value.

4. The system of claim 3, wherein the gathering tool is further configured to send the information about the computer system for the plurality of computer system objects and the plurality of relationships to the graph-building tool when the degree of reliability exceeds a reliability threshold value.

5. The system of claim 1, wherein the graph-building tool is configured to build the first intermediate graph, the second intermediate graph, and the final graph in the memory.

6. The system of claim 1, wherein the graph-building tool is further configured to optimize the final graph by at least reducing a relationship between computer system objects, eliminating computer system objects having a predefined object characteristic, eliminating relationships having a predefined relationship characteristic, eliminating duplicated relationships, or minimizing a number of intersections between relationship lines.

7. The system of claim 1, wherein the graphs database is populated with graphs based on the plurality of computer system objects and known malicious activity.

8. The system of claim 1, wherein the analysis tool is configured to determine malicious activity by analyzing the malicious activity ratio of the at least one preexisting graph and the similarity of the at least one preexisting graph to the final graph.

9. The system of claim 8, wherein the malicious activity ratio is calculated according to:

$$w = \prod_{i=1}^{N}\left(1 - \prod_{j=1}^{M}(1 - c_{\{i,j\}} \times w_j)\right)$$

wherein w is the malicious activity ratio of the computer system under analysis;
$w_j$ is the malicious activity ratio of a graph j selected from the graphs database;
$c_{\{i,j\}}$ is the degree of similarity between a graph i and the graph j selected from the graphs database;
N is the number of built graphs for the computer system under analysis; and
M is the number of graphs selected from the graphs database.

10. The system of claim 1, wherein the first and second intermediate graphs are formed according to a graph diameter less than a specified diameter.

11. A method for detecting malicious activity in a computer system, the method comprising:
   collecting, by a special-purpose driver on the computing system, information about the computer system fora plurality of computer system objects, wherein the special-purpose driver configured to intercept the information about the computer system from at least one of network traffic or a data exchange between two processes;
   determining a plurality of relationships between the plurality of computer system objects, wherein at least one of the plurality of relationships is determined using a degree of reliability characterizing the probability that two of the plurality of computer system objects have a logical or functional relationship, the relationship being logical when the two of the plurality of computer system objects are used together in the computer system, the relationship being functional when a first of the two of the plurality of computer system objects is used for analysis of a second of the two of the plurality of computer system objects in the computer system;

building at least a first intermediate graph and a second intermediate graph based on the plurality of computer system objects and the plurality of relationships, wherein the first and second intermediate graphs are formed with the plurality of computer system objects as vertices and the plurality of relationships as edges;

building a final graph based on the at least first and second intermediate graphs, wherein the final graph includes at least one vertex from the first intermediate graph and at least one vertex from the second intermediate graph and at least one edge connecting the at least one vertex from the first intermediate graph and at least one vertex from the second intermediate graph to reduce the computing system resource usage when the plurality of computer system objects grows non-linearly;

selecting, from a graphs database, at least one preexisting graph similar to the final graph based on a degree of similarity threshold, the at least one preexisting graph assigned a malicious activity ratio; and determining malicious activity based on a comparison of the at least one preexisting graph and the final graph.

12. The method of claim 11, wherein the degree of reliability of a relationship comprises a numerical value.

13. The method of claim 11, wherein the first intermediate graph, the second intermediate graph, and the final graph are built in memory of a computing system.

14. The method of claim 11, further comprising:
optimizing the final graph by at least reducing a relationship between computer system objects, eliminating computer system objects having a predefined object characteristic, eliminating relationships having a predefined relationship characteristic, eliminating duplicated relationships, or minimizing a number of intersections between relationship lines.

15. The method of claim 11, wherein determining malicious activity includes analyzing the malicious activity ratio of the at least one preexisting graph and the similarity of the at least one preexisting graph to the final graph.

16. The method of claim 11, wherein the first and second intermediate graphs are formed according to a graph diameter less than a specified diameter.

17. A non-transitory computer readable medium storing thereon computer executable instructions for detecting malicious activity in a computer system, including instructions for:

collecting, by a special-purpose driver on the computing system, information about the computer system for a plurality of computer system objects, wherein the special-purpose driver configured to intercept the information about the computer system from at least one of network traffic or a data exchange between two processes;

determining a plurality of relationships between the plurality of computer system objects, wherein at least one of the plurality of relationships is determined using a degree of reliability characterizing the probability that two of the plurality of computer system objects have a logical or functional relationship, the relationship being logical when the two of the plurality of computer system objects are used together in the computer system, the relationship being functional when a first of the two of the plurality of computer system objects is used for analysis of a second of the two of the plurality of computer system objects in the computer system; building at least a first intermediate graph and a second intermediate graph based on the plurality of computer system objects and the plurality of relationships, wherein the first and second intermediate graphs are formed with the plurality of computer system objects as vertices and the plurality of relationships as edges;

building a final graph based on the at least first and second intermediate graphs, wherein the final graph includes at least one vertex from the first intermediate graph and at least one vertex from the second intermediate graph and at least one edge connecting the at least one vertex from the first intermediate graph and at least one vertex from the second intermediate graph to reduce the computing system resource usage when the plurality of computer system objects grows non-linearly;

selecting, from a graphs database, at least one preexisting graph similar to the final graph based on a degree of similarity threshold, the at least one preexisting graph assigned a malicious activity ratio; and determining malicious activity based on a comparison of the at least one preexisting graph and the final graph.

18. The non-transitory computer readable medium of claim 17, further comprising instructions for:
optimizing the final graph by at least reducing a relationship between computer system objects, eliminating computer system objects having a predefined object characteristic, eliminating relationships having a predefined relationship characteristic, eliminating duplicated relationships, or minimizing a number of intersections between relationship lines.

* * * * *